W. X. STEVENS.
BOX MAKING MACHINE.
APPLICATION FILED SEPT. 12, 1911.

1,143,089.

Patented June 15, 1915.
5 SHEETS—SHEET 1.

Witnesses
T. L. Kochanu
L. A. Price

Inventor
William X. Stevens
By E. W. Bradford
Attorney

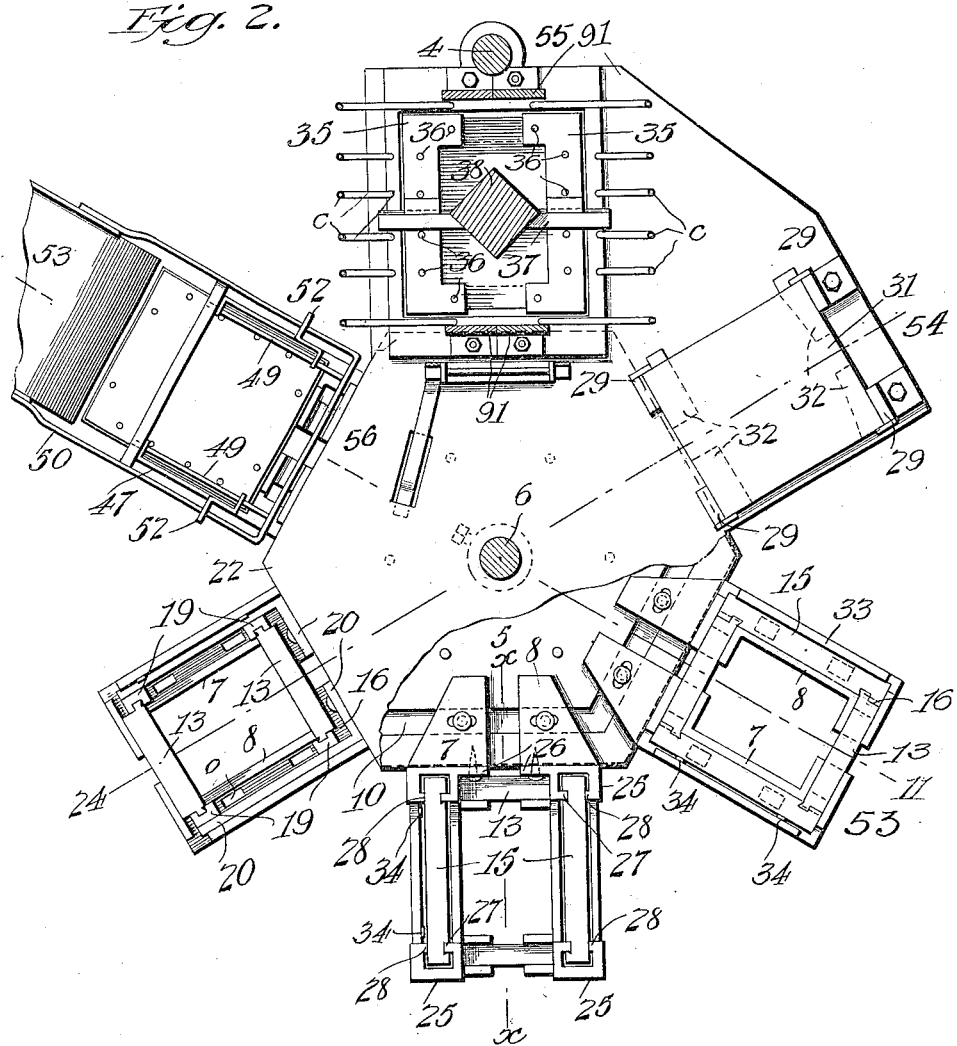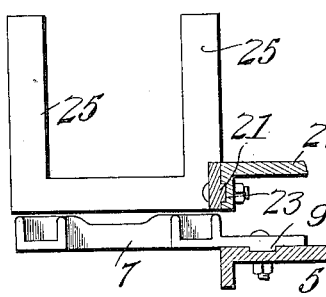

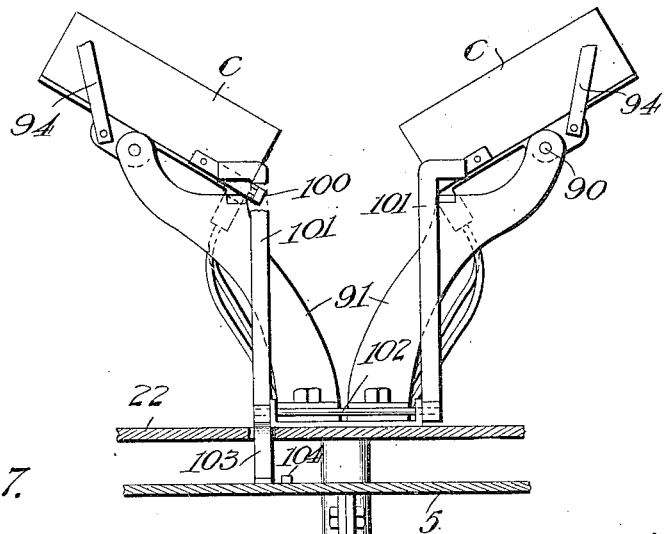
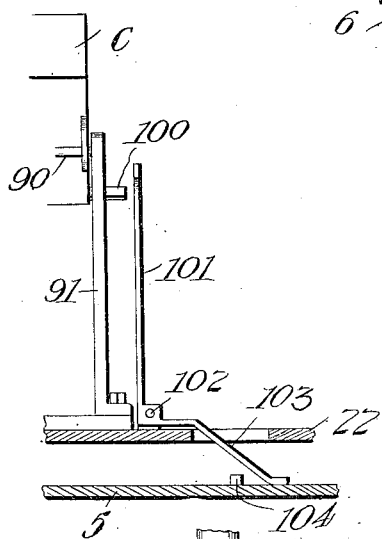
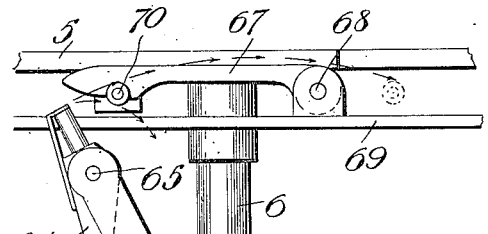
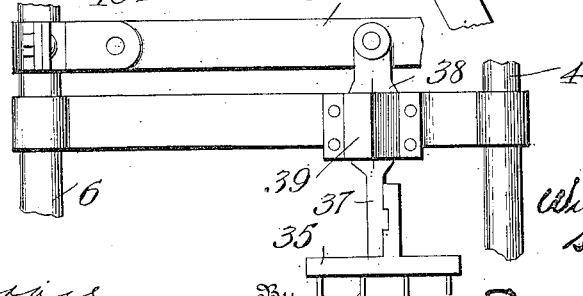

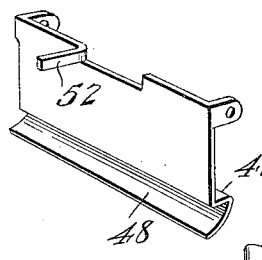
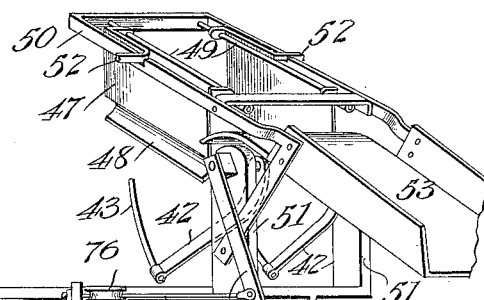
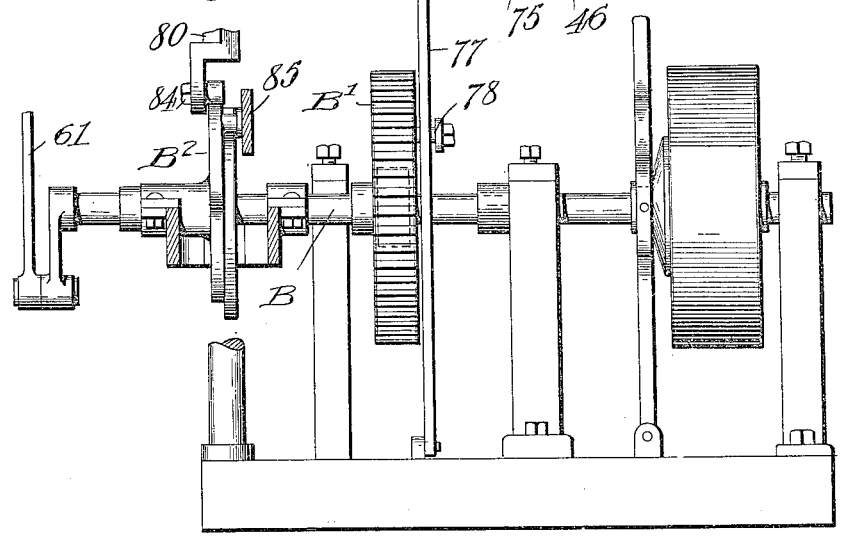
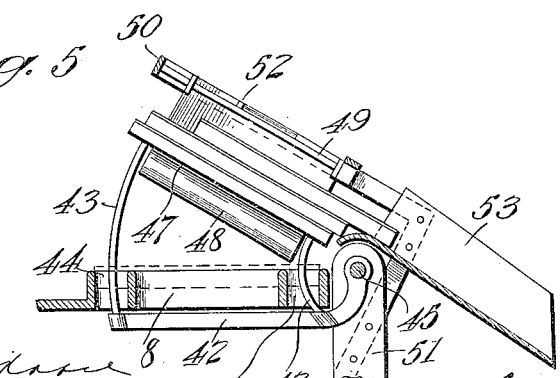

W. X. STEVENS.
BOX MAKING MACHINE.
APPLICATION FILED SEPT. 12, 1911.
1,143,089.
Patented June 15, 1915.
5 SHEETS—SHEET 5.
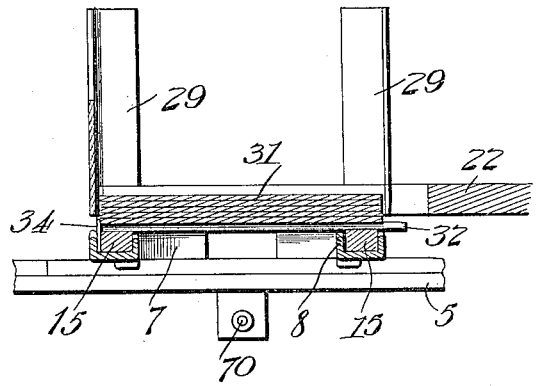
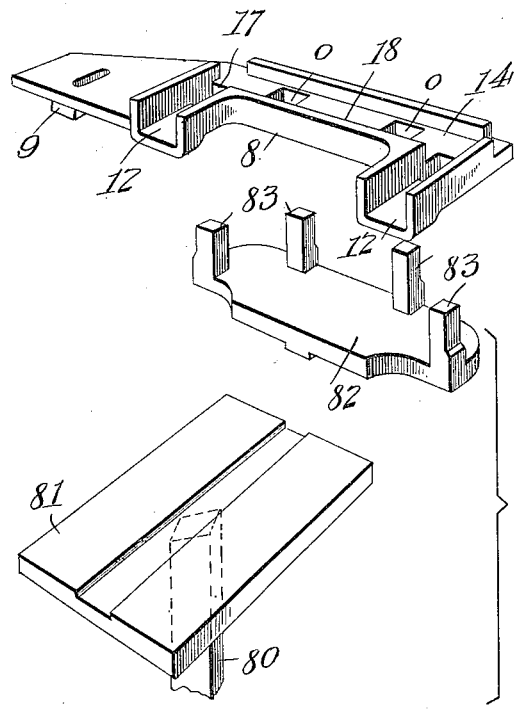
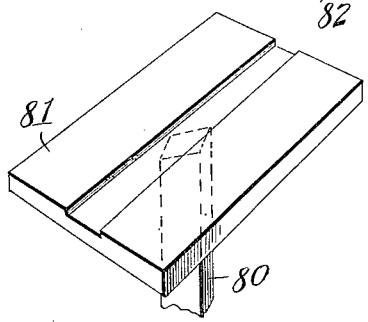
Witnesses
T. Moorhouse
L. A. Price
Inventor
William X. Stevens
By G. W. Bradford
Attorney

UNITED STATES PATENT OFFICE.

WILLIAM X. STEVENS, OF WASHINGTON, DISTRICT OF COLUMBIA, ASSIGNOR TO ELLA L. BARTON, OF JACKSONVILLE, FLORIDA.

BOX-MAKING MACHINE.

1,143,089.  
Specification of Letters Patent.  
Patented June 15, 1915.

Application filed September 12, 1911. Serial No. 648,911.

*To all whom it may concern:*

Be it known that I, WILLIAM X. STEVENS, a citizen of the United States, residing at Washington, in the District of Columbia, have invented certain new and useful Improvements in Box-Making Machines, of which the following is a specification.

This invention relates in general to machinery for making boxes and its object is to bring the parts of the box frame in position to be pressed together, to take on the ends or panels, to carry the parts thus assembled to the pressing and nailing mechanism and finally to discharge the completed box heads.

To this end my invention consists in the construction and combination of parts forming an automatic box assembling and nailing machine hereinafter more fully described and particularly stated in the claims, reference being had to the accompanying drawings, in which—

Figure 1:
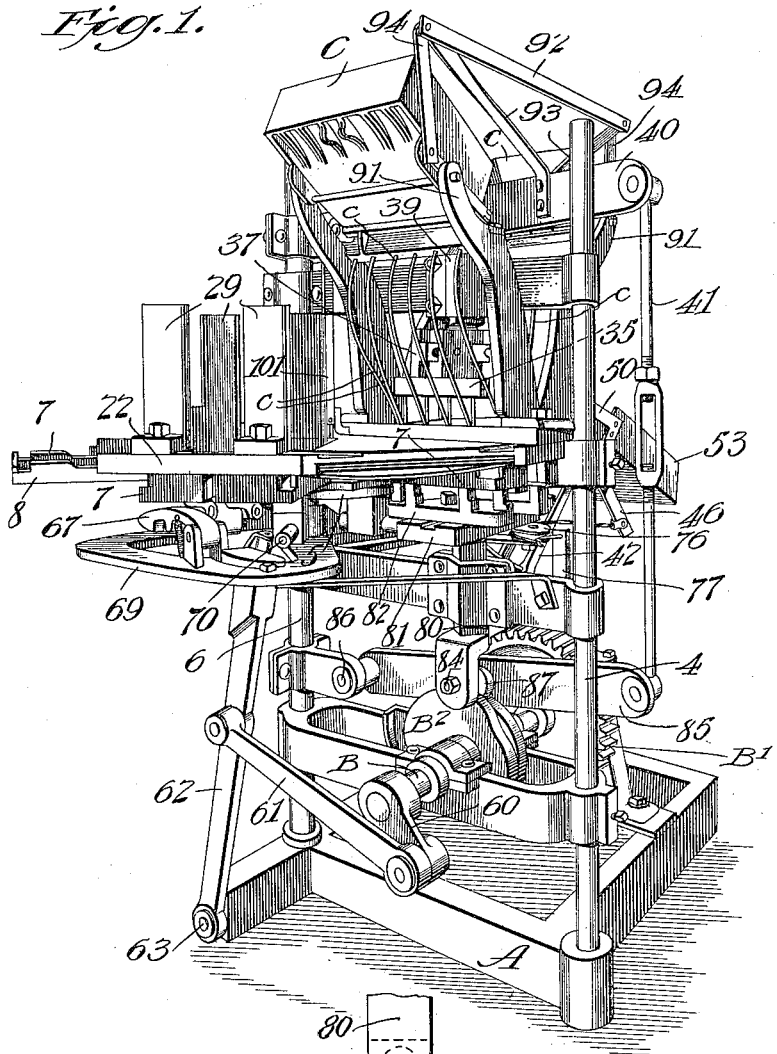
Figure 14:
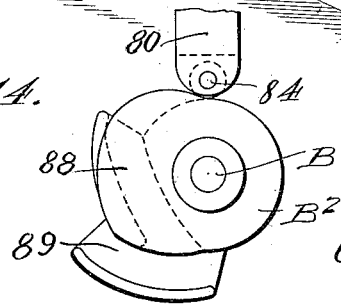

Figure 1 is a perspective view of a box assembling and nailing machine embodying my said invention, Fig. 2 a horizontal section but showing the table and revolving parts principally in top plan, Fig. 3 a detail end elevation of the nail boxes and adjacent parts, Fig. 4 a detail view of the driving gear showing a part of the operating devices and showing the discharge mechanism in perspective, Fig. 5 a longitudinal sectional view through the discharge mechanism, Fig. 6 a detail view of one of the supporting chairs in the receiving hopper, Fig. 7, a detail view showing the nail picker bar operating mechanism, Fig. 8, a detail view illustrating portions of the rotary table operating mechanism, Fig. 9, a detail view of the hopper posts 25 and the adjacent parts, Fig. 10, a detail cross section through the hopper at station 54 and adjacent parts, Fig. 11, a detail view of one side of one of the frame-holding chairs, Fig. 12, a detail view of two parts of the assembling head, Fig. 13, a detail view of the nailing head and adjacent parts, and Fig. 14, a detail view of the cam for operating the assembling head and nailing heads.

In said drawings the portions marked A represent the base of the machine, B the main driving shaft and C the nail boxes.

The general construction and arrangement of the frame and many of the parts is such as may be best adapted for the purpose and requires no special description. The nail boxes C and nailing mechanism form the subject matter of a separate application and need not be particularly described herein. The description will therefore be largely confined to the mechanism to which the improvements constituting the invention particularly relate.

In the drawing the numeral 5 represents the carrying table, hexagonal in contour, and mounted to revolve on a vertical shaft 6, which is a fixed portion of the machine frame being mounted in base A. On this carrier, at each of its six sides, a pair of chairs 7, 8, are mounted, each chair having a rib 9 fitting a groove 10 in the face of the carrier 5 whereby the two chairs of a pair may be adjusted in a line tangent to the circle of motion of the table and be separated more or less to adapt them to frames of different sizes and yet remain parallel with the central radius, as 11, of that side. Each chair has floors on two levels, the lower floor 12, being to receive the side pieces 13, which have the dove-tailed tenons at their ends, and the upper floor 14 to receive the end pieces 15, which have the dove-tailed mortises in their inner sides. The chairs are fitted to receive the end pieces 15 with about one thirty second of an inch freedom each way. They are fitted to receive side pieces 13 with about the same lateral freedom and the chairs are to be adjusted on the table 5 to suit the length of the frame being assembled, the shoulders 16 of side pieces 13 meeting the faces 17 in the chairs, which faces 17 are in the same vertical planes as the adjacent faces 18 against which the end pieces 15 rest, whereby the exact registry of the tenon with its mortise is insured. Said faces 17 are recessed at their ends to accommodate the dove-tailed tenons, as will be readily understood.

A hopper for side piece 13 is preferably provided comprising two pairs of posts 19, grooved to receive by their tenons, two piles of frame pieces 13, and secured to brackets 20, each of which is provided with a rib 21 to engage a groove 23 in the edge of table 22, as shown in Fig. 9, whereby these brackets are adjustable relative to the radial line 24. Two other pairs of posts 25, are mounted on brackets 26 to serve as hoppers to receive piles of end pieces 15. These posts are provided each with a rib 27 to enter mortises in the pieces 15, also with backing ribs 28 to keep the pieces 15 in engagement with the ribs 27, and these brackets are adjustable along the edge of table 22 to correspond with the length of the side pieces 13. Two more pairs of posts 29 are secured to a pair of brackets, which are fitted and engage the table 22 like the brackets 20 and 26. Said posts are shaped as corner grooves to receive a pile of box ends or panels 31, which rest on thin plates 32, that are attached to the brackets and located enough above the side 33 to permit one panel at a time to pass over the said side. The rear chair 7 of each pair is provided with studs 34 which project above the plane of the pieces 15, enough to engage one panel.

The table 5 is to be revolved step by step, one sixth of a circle at each move by mechanism as follows: A crank 60 on one end of shaft B is connected by a pitman 61 to a lever 62 which is pivoted at its lower end on a pivot 63 projecting from the base A. The upper end of said lever 62 is bifurcated and has a head 64 pivoted therein, the lower end of which engages on one side of a tapered wall in the bifurcation, holding said head when in normal position, in line with the lever, but permitting it to tilt in the opposite direction on its pivot 65. A latch 67 is mounted on a pivot 68 on a boss on an appropriate part 69 of the frame. Said latch is adapted to engage with a radial pin 70 projecting from one corner of each of the six sides of the carrier table. The operation will be best understood by an examination of Figs. 1 and 8. As the crank 60 revolves it operates said lever 62 back and forth. The forward motion being in the direction indicated by the arrows in Fig. 8, the top of the head 64 will first strike the inclined underface of the rear end of the latch and lift it free from engagement with the pin 70 and at the same time carry said pin and the table forward one full stroke, or to the position indicated by dotted lines in the right of said figure. When this position is reached, the pin 70 of the next side of the carrier table will reach the notch in the latch and be engaged thereby, thus holding the carrier in position until forcibly advanced by the next forward movement of said lever. On the return movement of said lever, head 64 turns on its pivot and passes under the latch and pin freely, but as soon as it is past the weight of the lower end of the head causes it to fall into normal operative position, as shown in whole lines in Fig. 8.

A pair of hammer heads 35, carrying a series of plungers 36, one for each nail to be driven, are mounted to slide on a cross piece 37, of a head 38, that is fitted to be reciprocated vertically, in a bearing 39 of the main frame by means of a lever 40, which is connected by a rod 41, with the driving gear of the machine.

A pair of ejecting levers 42, provided with curved fingers 43, adapted to pass up through holes 44, are rigidly yet adjustably fixed on a rock-shaft 45. An arm 46 thereon is connected by a flexible connection 75, which runs over a sheave 76, to the upper end of a lever 77. Said lever is pivoted at its lower end and is mounted in the path of a pin 78 projecting from one side of a gear B' on main shaft B. At each revolution of said shaft, or at each step in the forward movement of the carrier, said rock-shaft is operated to project fingers 43 upward to lift the finished box-end from the chair above.

A pair of swinging shelves 47, having wedge-shaped lower ends 48, depend from rods 49, which are adjustably located in a frame 50, which is supported by brackets 51, upon the table 22.

Arms 52 upon the depending shelves rest upon the frame 50 and limit their inward swing to the length of the box heads being operated upon.

A slanting discharge spout 53 is secured to fixed portions of the frame.

An assembling head is mounted on a reciprocating plunger 80 and comprises a grooved plate 81 in which are mounted a pair of heads 82 provided with a series of vertical presser fingers 83 which are adapted to project through the holes 0 in the chairs 7 and 8. The lower end of plunger 80 carries an anti-friction bearing on a pin 84 which is adapted to engage with a cam $B^2$ on the main shaft B. The connecting rod 41, which through the lever 40 operates the plunger 38, carrying the nailing heads, is connected to the outer end of a lever 85 which is pivoted at its opposite end on a pivot 86 carried by a suitable part of the frame. Said lever also carries an anti-friction bearing 87 adapted to operate in connection with one of the cam faces of the cam $B^2$.

The operation will be best understood by an examination of Fig. 1 and Fig. 14, which shows the cam formation most clearly. As shaft B makes a complete revolution it will be seen that plunger 80 is first forced upward, which operates to force the tenons of side pieces 13 into the mortises in end pieces 15 and clamp the assembled frame, including the panel 31, firmly against the underside of the nailing chuck and then the groove 88 on one side of said cam engages bearing 87 and forces the plunger carrying the nailing head downwardly, each of the points 36 striking and driving a nail which has been fed to position and completing the formation of the box head. A continuation of the rotation of the shaft then elevates the nail head and groove 89 of the cam engaging with the bearing 84 and turns the assembling head downward, this operation being repeated at each step forward of the revolving carrier.

The nailing boxes C are mounted on pivots 90 on brackets 91 secured to the stationary top 22 of the machine. A frame consisting of a bar 92 and braces 93 is mounted on lever 40 and pivotally connected by links 94 with each nail box behind its pivot so that said nail boxes are tilted back and forth as lever 40 is raised up and down by the operating cam B². The nail feeding mechanism forms the subject matter of a separate application and need not be especially referred to, but consists of picker bars 100 adapted to be operated in one direction by means of a spring (not shown) and adapted to be operated in the other direction by means of strike bars 101 rigidly secured on a cross shaft 102, one of which has a foot 103 depending through a slot in the top 22 and adapted to be operated to tilt the frame, or bars, 101, by means of trips 104 mounted at intervals on revolving table 5 and arranged to operate said bars to throw the pickers at appropriate points.

The pressing together and nailing is done at station 55, the nailing mechanism being the subject of another application for a patent of even date herewith. On arriving at station 56, the completed heads are raised out of the chairs by the operation of levers 42, and lodged upon the inclined shelves 47, from which they slide into the delivery spout 53.

At every step of rotation of the carrier table 5, the function at each station is performed during the stop, excepting at 53, which is left open for free inspection of the work.

Having thus fully described my said invention, what I claim as new and desire to secure by Letters Patent, is:

1. A box assembling and nailing machine comprising a multiple-sided carrier table mounted for intermittent rotary motion in a horizontal plane, chairs with floors on two levels fitted to receive box-parts first on the lower level and then at right angles thereto on the higher level and mounted on the table at each side, and operating mechanism for the said carrier table, substantially as set forth.

2. A box making machine comprising a multiple-sided rotary box-part carrier table, provided with chairs having floors both for the side pieces and for the end pieces, the floors for the one being on a level above those for the other and fitted to receive box parts and mounted for tangential adjustment on the table, and operating mechanism for the said carrier table, substantially as set forth.

3. A box assembling and nailing machine comprising a multiple-sided rotary table mounted on a vertical pivot, and box frame carrying-chairs mounted on the several sides of said table and formed to receive the side and end pieces at right angles to each other, and with their interlocking corner formation in register, the bottoms of said chairs being formed with two levels to support the side pieces and end pieces on different planes, one above the other, substantially as set forth.

4. A machine for making box frames comprising a table mounted to rotate in a horizontal plane and having its sides arranged as a regular polygon and equi-distant from the axis of rotation, the center of which is the axis of the table, means for rotating said table step by step, frame carrying chairs mounted on the several sides of said table and arranged to receive the frame pieces in position for assembling, an assembling head located at the stopping point of said table beyond the last frame piece receiving point, means for operating said assembling head to force said frame pieces together, nailing mechanism located at the next successive stopping point of said table, means for operating said nailing mechanism, discharging mechanism located at the next successive stop of said table, and means for operating said discharging mechanism, substantially as set forth.

5. A box machine comprising a horizontal table, means for imparting intermittent rotary motion thereto, chairs secured to the sides of said table and formed with a bottom on two levels adapted to receive the sides and ends of a box frame, one above the other in position for assembling, and means operable for pressing said respective frame pieces into the same plane to engage the interlocking parts thereof, substantially as set forth.

6. A box machine comprising a multiple-sided table fitted for intermittent rotary motion, chairs attached to the table and fitted to carry sides and ends of box frames, a hopper to receive a pile of panels and located over the path of the said chairs, and studs on one of the chairs arranged to project above the plane of the bottom of the hopper to engage one panel, substantially as set forth.

7. A box frame machine comprising a multiple-sided horizontal table, means for imparting intermittent rotary motion thereto, box frame receiving and carrying chairs carried on the respective sides of said table, assembling mechanism arranged to operate upon the frame pieces carried by said chairs at the next stopping interval beyond the stopping interval at which the pair of frame pieces required to complete the frame were received, nailing mechanism arranged to operate at the next stopping interval, and discharging mechanism arranged to operate at the next interval, substantially as set forth.

8. A box frame machine comprising a multiple-sided table, means for imparting intermittent rotary motion thereto, chairs fixed to the several sides of said table and formed to receive and carry the box frame parts in position for assembling, means for pressing said parts of the box frame together, and means for nailing said box frames, the pressing and nailing mechanisms being arranged to operate successively in the order stated, substantially as set forth.

9. A many-sided table fitted for intermittent rotary motion, chairs fixed upon the table and fitted to carry the frames and panels of boxes, means for nailing the box parts together, and a discharging device located to register with the chairs at one of their stopping intervals and comprising a pair of levers journaled beyond the circle of revolution of the outer sides of the chairs and having fingers to pass up through apertures in the chairs, substantially as set forth.

10. A multiple-sided table fitted for intermittent rotary motion, means upon the table for carrying frames and panels to form box heads, means for nailing them, means for raising the finished heads from the carrying means, and a pair of shelves hung at a slant to receive the raised heads and slide them off, substantially as set forth.

11. A machine for forming box frames with interlocking joints at their corners comprising an intermittently rotatable table, a series of holders thereon arranged to receive the box parts with their interlocking formations in register, means for advancing said carrier step by step, means for pressing the parts together to complete said interlocking joints, and means for nailing them, substantially as set forth.

In witness whereof, I have hereunto set my hand and seal at Washington, D. C., this 26th day of August, A. D. nineteen hundred and eleven.

WILLIAM X. STEVENS. [L. s.]

Witnesses:
E. W. Bradford,
F. A. Colford.

Copies of this patent may be obtained for five cents each, by addressing the "Commissioner of Patents, Washington, D. C."